(12) United States Patent
Noh et al.

(10) Patent No.: US 8,947,436 B2
(45) Date of Patent: Feb. 3, 2015

(54) METHOD, APPARATUS AND SYSTEM FOR DENSE GRAPH SIMPLIFICATION, AND RECORDING MEDIUM FOR THE SAME

(75) Inventors: Junyong Noh, Daejeon (KR); Yeongho Seol, Daejeon (KR); Jaewoo Seo, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 691 days.

(21) Appl. No.: 13/099,330

(22) Filed: May 2, 2011

(65) Prior Publication Data
US 2012/0223948 A1   Sep. 6, 2012

(30) Foreign Application Priority Data
Mar. 2, 2011   (KR) .................. 10-2011-0018563

(51) Int. Cl.
*G06T 11/20* (2006.01)

(52) U.S. Cl.
CPC .................................... *G06T 11/203* (2013.01)
USPC .......................................... 345/440; 345/442

(58) Field of Classification Search
CPC .............................. G06T 11/00; G06T 11/203
See application file for complete search history.

(56) References Cited

U.S. PATENT DOCUMENTS

| | | | | |
|---|---|---|---|---|
| 7,433,799 | B2 * | 10/2008 | Lin et al. ...................... | 702/167 |
| 2005/0238244 | A1 * | 10/2005 | Uzawa ......................... | 382/242 |
| 2011/0066578 | A1 * | 3/2011 | Chong et al. ................... | 706/12 |

OTHER PUBLICATIONS

Daniel Hennessey, Daniel Brooks, Alex Fridman and David Breen, "A Simplification Algorithm for Visualizing the Structure of Complex Graphs", 12th International Conference Information Visualisation, 2008, IEEE.*
Stephen Weston, "An introduction to the mathematics and construction of splines", Addix Software Consultancy Limited, Version 1.6, Sep. 2002.*
Authorization of Examiners Amendment: Authorization_Examiners Amendment_13099330_091714.*
Draft of Proposed amendment: 20140917_P03711DH_TE_ ExAmdt.*

\* cited by examiner

*Primary Examiner* — Kee M Tung
*Assistant Examiner* — Sing-Wai Wu
(74) *Attorney, Agent, or Firm* — The PL Law Group, PLLC

(57) ABSTRACT

Provided are a method, an apparatus and a system for dense graph simplification, and a recording medium for the same. The method includes receiving an original graph and extracting a plurality of salient points, which minimize a cost representing a greatest vertical distance between the original graph and each of a plurality of lines connecting two data points in a designated region on the original graph; and outputting a simplified graph in which the extracted salient points are connected. Thus, optimal results are ensured in dense graph simplification, and interactive control is allowed for a user.

18 Claims, 10 Drawing Sheets

Simplify curve

Our method

METHOD, APPARATUS AND SYSTEM FOR DENSE GRAPH SIMPLIFICATION, AND RECORDING MEDIUM FOR THE SAME

CROSS-REFERENCE TO RELATED APPLICATIONS

This application claims priority under 35 U.S.C. §119 to Korean Patent Application No. 10-2011-0018563, filed on Mar. 2, 2011, in the Korean Intellectual Property Office, the disclosure of which is incorporated herein by reference in its entirety.

TECHNICAL FIELD

The present disclosure relates to a method, an apparatus and a system for dense graph simplification, and a recording medium for the same.

BACKGROUND

Graphs having dense data are frequently found in engineering fields including stereographic 3D and computer animation. However, since a graph having unnecessary dense data makes interactive control difficult, its simplifying methods have been developed.

For example, computer programs widely propagated and used at present provide a graph simplification function, called "simplify curve". However, this curve simplification function does not properly extract salient points of an original graph. Thus, the curve simplified by the curve simplification function may not exactly express features of the original graph.

The Douglas-Peucker algorithm is a well-known algorithm for reducing the number of points in a curve that is approximated by a series of points. The Douglas-Peucker algorithm uses the greedy method that incrementally adds data that should be included in a graph, while remaining a starting point and an ending point on the graph. The Douglas-Peucker algorithm is known to give a generally good simplified graph, but this method is not able to extract an optimized simplified graph.

SUMMARY

An embodiment of the present disclosure is directed to providing a method for dense graph simplification, which allows interactive control by a user and giving an optimal simplified graph.

Another embodiment of the present disclosure is directed to providing an apparatus for dense graph simplification for realizing the above method.

Further embodiment of the present disclosure is directed to providing a system for dense graph simplification for realizing the above method.

In one general aspect, a method for dense graph simplification includes receiving an original graph and extracting a plurality of salient points using a salient point extracting unit, which minimize a cost representing a greatest vertical distance between the original graph and each of a plurality of lines connecting two data points in a designated region on the original graph; and outputting a simplified graph in which the extracted salient points are connected in a designated manner and a tangent is adjusted by a tangent adjusting unit.

The extraction of the plurality of salient points may include receiving the original graph; calculating, for all data points in the designated region on the original graph, the cost corresponding to a plurality of lines going to a plurality of other points located in a forward direction and the salient point corresponding to the cost, and storing the cost and the salient point in a 2-point path lookup table; and selecting the salient point corresponding to the respective cost, if the calculated cost is smaller than or equal to a designated cost threshold.

The selection of the salient point may include selecting the salient point corresponding to the respective cost, if the calculated cost is smaller than or equal to a designated cost threshold; determining whether the number of calculated salient points is greater than or equal to a designated number, if the calculated cost is greater than the designated cost threshold; selecting the calculated salient points, if the calculated number of salient points is greater than or equal to the designated number; and returning to the step of storing the cost and the salient point in the 2-point path lookup table, if the number of the calculated salient points is smaller than the designated number.

After receiving the original graph, the extraction of the plurality of salient points may further include receiving settings including information about the designated region on the original graph.

The output of the simplified graph may include connecting the extracted salient points with a Catmull-Rom spline; and outputting the simplified graph in which the extracted salient points are connected and the tangent is adjusted.

In connecting the extracted salient points with a Catmull-Rom spline, a tangent parameter of the Catmull-Rom spline may be exceptionally applied as a horizontal flat tangent at local maximum points and local minimum points.

In another aspect, an apparatus for dense graph simplification includes a salient point extracting unit for receiving an original graph and extracting a plurality of salient points, which minimize a cost representing a greatest vertical distance between the original graph and each of a plurality of lines connecting two data points in a designated region on the original graph; and a tangent adjusting unit for outputting a simplified graph in which the extracted salient points are connected in a designated manner and a tangent is adjusted.

The salient point extracting unit may include a calculation accelerating unit that uses parallel graphics processing unit (GPU) programming for calculation of the cost.

The salient point extracting unit may further include a 2-point path lookup table for storing a cost corresponding to a plurality of lines going to a plurality of other points located in a forward direction for all data points in the designated region on the original graph and also storing a salient point corresponding to the cost.

The tangent adjusting unit may connect the extracted salient points with a Catmull-Rom spline and output a simplified graph in which a tangent of the connected curve is adjusted.

Other features and aspects will be apparent from the following detailed description, the drawings, and the claims.

In yet another aspect, a system for dense graph simplification includes the apparatus for dense graph simplification, at least one of a user interface, a storage medium and network for receiving the original graph and transferring the original graph to the apparatus for dense graph simplification, and an application program unit to which the simplified graph is outputted from the apparatus for dense graph simplification.

According to an embodiment of the present invention, the user interface receives the original graph with settings of a user and applies the settings to the apparatus for dense graph simplification.

According to an embodiment of the present invention, the application program unit is implemented as software that performs designated operations by using the simplified graph.

According to an embodiment of the present invention, the application program unit is a storage medium storing the simplified graph.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
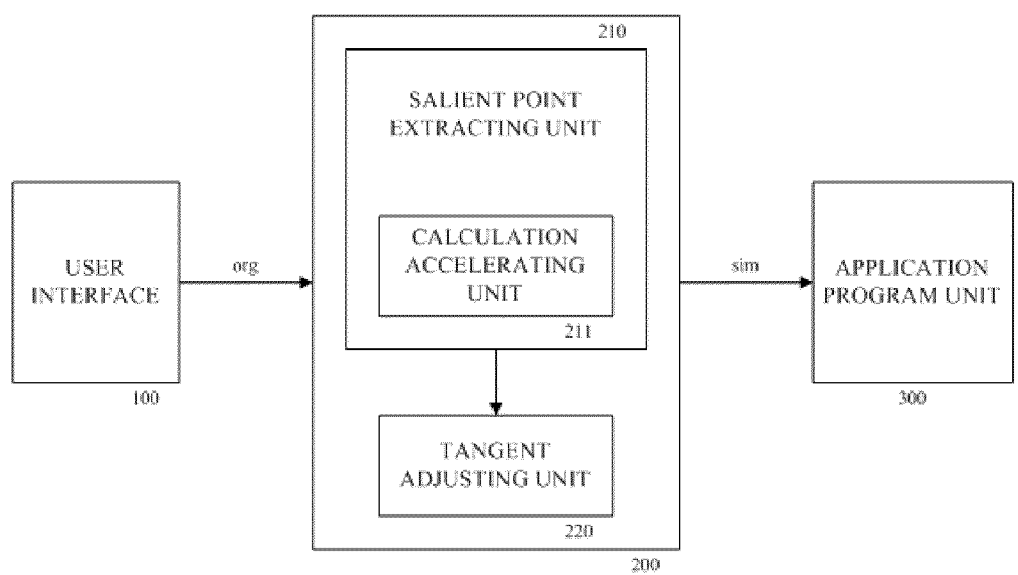
FIG. 1 is a block diagram showing an apparatus for dense graph simplification according to an exemplary embodiment.

FIG. 1 is a block diagram showing an apparatus for dense graph simplification according to an embodiment of the present disclosure. The apparatus 200 for dense graph simplification according to an embodiment of the present disclosure receives an original graph (org) of dense data through a user interface 100, simplifies it, and outputs a simplified graph (sim). The apparatus 200 includes a salient point extracting unit 210 and a tangent adjusting unit 220.

If the original graph (org) of dense data are applied through the user interface 100, the salient point extracting unit 210 extracts salient points on the original graph (org) by applying dynamic programming to the original graph (org). The dynamic programming is a bottom-up approach in which simpler subproblems are solved and the result is stored, and then the more complex problem is solved based on the stored result. The dynamic programming is frequently used to solve optimizing problems or optimal path problems.

In particular, in the apparatus 200 for dense graph simplification according to an embodiment of the present disclosure, the salient point extracting unit 210 uses the dynamic programming as mentioned above to extract a plurality of salient points that are points for minimizing a cost between the original graph (org) and a simplified graph. Here, the cost is defined as the maximum vertical distance between the original graph (org) and the line formed by two points connectable in the original graph (org). Thus, the salient points represent points that may minimize a vertical distance between the original graph (org) and the simplified graph (sim). A method for calculating the cost to extract salient points will be described later.

In addition, the salient point extracting unit 210 includes a calculation accelerating unit 211. The time for calculating a cost between two points, performed by the salient point extracting unit 210, is rapidly increased as the number of data of the original graph (org) increases. Thus, if the number of data of the original graph (org) is great, the time taken by the salient point extracting unit 210 for calculating a cost to extract salient points is greatly elongated. In order to reduce the time for calculating a cost in the salient point extracting unit 210, the calculation accelerating unit 211 uses parallel graphics processing unit (GPU) programming to greatly reduce the time for calculating a cost.

The parallel GPU programming performs calculation by using a GPU instead of the central processing unit (CPU) that commonly performs calculation in computer systems. It is because the GPU may have a greater number of cores than CPU due to the recent rapid development of the GPU. Generally, commonly used CPUs have 2, 4, or 8 cores, while GPUs have 48, 128, or 256 cores. Though the performance of each core of the GPU is inferior to that of the CPU core, the time for calculation may be greatly reduced due to the large number of cores when simple calculations need to be made repeatedly, because the large number of cores allows parallel calculation at once. However, in order to perform parallel calculation using the GPU, the program for performing calculation by using the CPU cannot be used as it is. Thus, it is needed to perform programming separately from existing programming, and this is called the parallel GPU programming.

As described above, in the embodiment of the present disclosure, the salient point extracting unit 210 includes the calculation accelerating unit 211 using the parallel GPU programming in order to reduce the time for calculating a cost, which is rapidly elongated in accordance with the number of data of the original graph (org).

Meanwhile, the tangent adjusting unit 220 connects the salient points, extracted by the salient point extracting unit 210, in a designated manner, and then adjusts and outputs a tangent of the simplified graph (sim). The method for adjusting a tangent may be directly designated by a user via the user interface 100. Also, the user may individually designate tangents for salient points (local maximum points, local minimum points, or the like) via the user interface 100.

The simplified graph (sim) having a tangent adjusted by the tangent adjusting unit 220 is output to an application program unit 300 as input data of various kinds of application programs, which use the simplified graphs. Here, the application program unit 300 may be implemented as software that performs designated operations by using a graph or a storage medium that may store a simplified graph.

Figure 2:
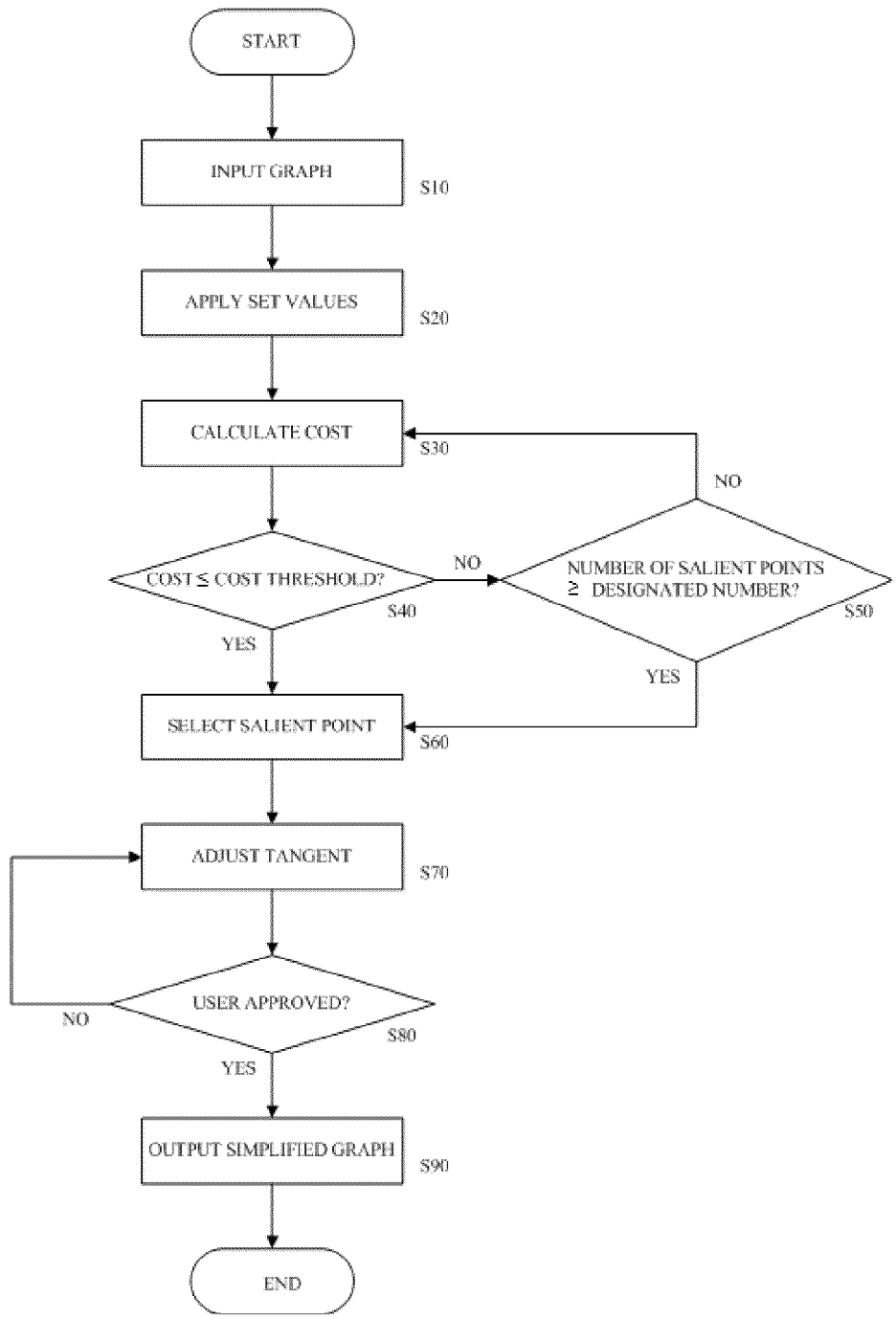
FIG. 2 is a flowchart illustrating a method for dense graph simplification according to an exemplary embodiment.
Figure 3:
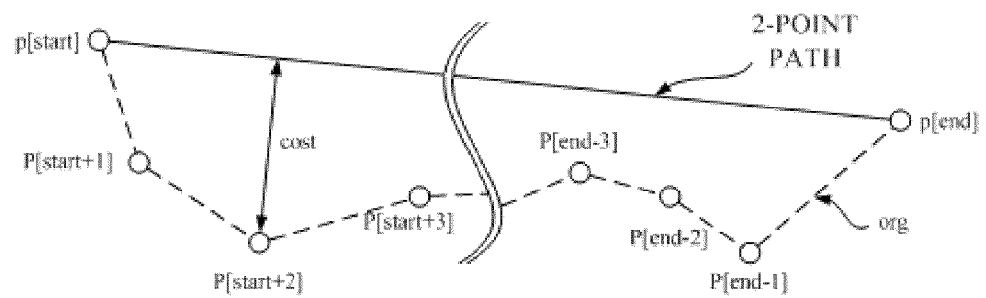
FIG. 3 is a schematic view showing a method in which 2-point path cost is defined.

FIG. 2 is a flowchart illustrating a method for dense graph simplification according to an embodiment of the present disclosure, and FIG. 3 shows a method of defining 2-point path cost according to an embodiment.

To describe the method for dense graph simplification according to an embodiment of the present disclosure with reference to FIGS. 1 to 3, first, the apparatus 200 for dense graph simplification receives an original graph (org) (S10). Here, the apparatus 200 for dense graph simplification may receive the original graph (org) in a graph form. But, typically, the apparatus 200 receives a data value of each point on the original graph (org). Also, though it has been described that the apparatus 200 for dense graph simplification receives the original graph via the user interface 100, the apparatus 200 may also receive an original graph via a separate storage medium or network.

After that, the apparatus 200 for dense graph simplification receives set values designated by the user (S20). Here, the set values designated by the user may include the range of simplification and the degree of simplification. The range of simplification represents set values that define a region of an original graph to be simplified. Unless the user separately applies set values for the range of simplification, the range of simplification may be set to perform simplification to the entire original graph with default options. The degree of simplification may include a cost threshold desired by the user and the number of salient points. In addition, the set values designated by the user may additionally include curve form of the simplified graph and point information of points such as the above salient points (local maximum points, local minimal points, or the like) that deviate from the designated curve form. Similarly to the range of simplification, unless the user applies set values, the apparatus 200 for dense graph simplification 200 may perform simplification by using default set values which are preset.

If set values are applied, the salient point extracting unit 210 of the apparatus 200 for dense graph simplification calculates a cost by using dynamic programming (S30). Hereinafter, the method for calculating a cost by dynamic programming will be described with reference to FIG. 3. First, for points p[i] (i is a natural number) (p[i]=p[start], . . . , p[end]) on the original graph (org), costs corresponding to all lines going to all of other points p[j] (j is a natural satisfying j>i) located in a forward direction are stored in a 2-point path lookup table of the salient point extracting unit 210. Here, the points p[i] on the original graph (org) represent all points on the original graph in a case where the entire original graph (org) is simplified, but in a case where a region to be simplified is set, the points p[i] on the original graph (org) represent all the points in the region to be simplified. And, the 2-point path lookup table represents a partial region of a memory provided to the salient point extracting unit 210. After that, among all the points p[i], a certain salient point p[m] (m is a natural number) is found based on Equation 1 in order to calculate a k-th path (k is a natural number) starting from a starting point p[start] and going to all of other points p[n] (n=start+k−1, . . . , end).

$$\min_m \max(E_{k-1}(p[start],p[m]), E_2(p[m],p[n])) \quad \text{Equation 1}$$

In Equation 1, $E_k$ denotes the cost of k-th path between two points. The cost value of each point is consulted from the 2-point lookup table in which cost values are calculated and stored in advance, and a cost value of a new path is also stored in the 2-point lookup table. As described above, in the process of calculating a cost by the salient point extracting unit, the calculation accelerating unit 211 uses parallel GPU programming for the purpose of faster calculation. In the above, each point represents a data point expressed with a data value.

In addition, it is determined whether the calculated cost is smaller than or equal to a cost threshold designated by the user (S40). If the calculated cost is smaller than or equal to the cost threshold designated by the user, the salient point extracting unit 210 selects salient points extracted in correspondence to the calculated cost (S60). In other words, among the salient points p[m] stored in the 2-point lookup table, finally extracted salient points are selected. Otherwise, if the calculated cost is greater than the cost threshold designated by the user, it is determined whether the number of the extracted salient points is greater than or equal to a user-designated number of salient points (S50).

If the number of the extracted salient points is greater than or equal to a user-designated number of salient points, the salient point extracting unit 210 selects salient points extracted in correspondence to the calculated cost (S60), similarly to the case where the calculated cost is smaller than or equal to the cost threshold designated by the user. If the number of extracted salient points is smaller than the user-designated number of salient points, a cost is calculated again (S30).

If the salient point extracting unit 210 selects the salient points, the tangent adjusting unit 220 adjusts a tangent by connecting the salient points selected by the salient point extracting unit 210 (S70). At this time, the tangent adjusting unit 220 may use a Catmull-Rom spline to connect the selected salient points. The Catmull-Rom spline is a curve connecting data points by interpolating the data points with a soft curve. A tangent at each data point is set to be the same as the tangent of a line connecting front and back data points, a form of curve is adjusted by designating its tangent length parameter. Also, in the tangent adjusting unit 220, the length parameter of the Catmull-Rom spline connecting the salient points is designated as a unit length.

Exceptionally, the tangent parameter of the Catmull-Rom spline has a horizontal flat tangent at local maximum points and local minimal points, differently from the definition of the Catmull-Rom spline. It is for the convenience of use after simplification is considered.

If the tangent of the simplified graph is adjusted by the tangent adjusting unit 220, the adjusted graph is displayed on the user interface 100 to obtain user's approval (S80). If the user approves the simplified graph with an adjusted tangent, the apparatus 200 for dense graph simplification outputs the simplified graph (sim) to the application program unit 300 (S90). However, if the user does not approve the simplified graph with an adjusted tangent, the tangent adjusting unit 220 adjusts the tangent of the simplified graph again (S70). At this time, the user may apply an additional set value to the apparatus for dense graph simplification in order to adjust the tangent of the simplified graph again. Also, since the tangent adjusting unit 220 adjusts the tangent of the simplified graph based on the set values stored in the apparatus 200 for dense graph simplification in advance or initially applied by the user, the simplified graph (sim) may be output to the application program unit 300 without user's approval.

Figure 4:
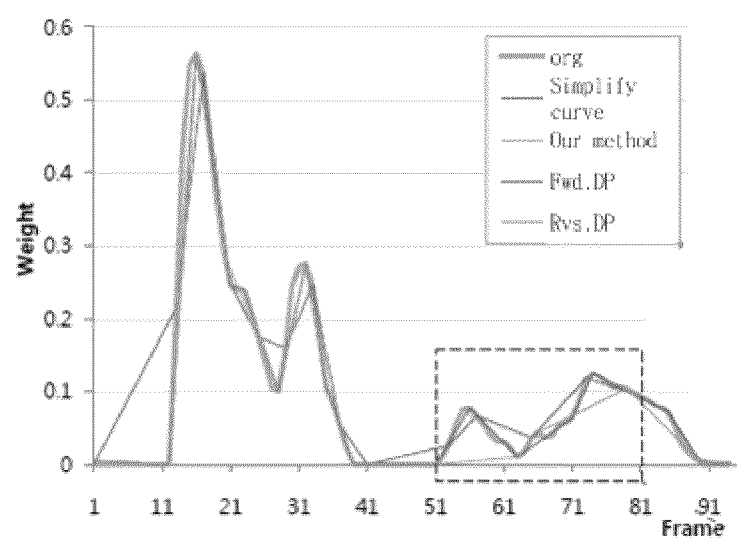
FIGS. 4 to 9 are graphs which compare the existing graph simplification methods and the method according to an embodiment of the present disclosure.
Figure 5:
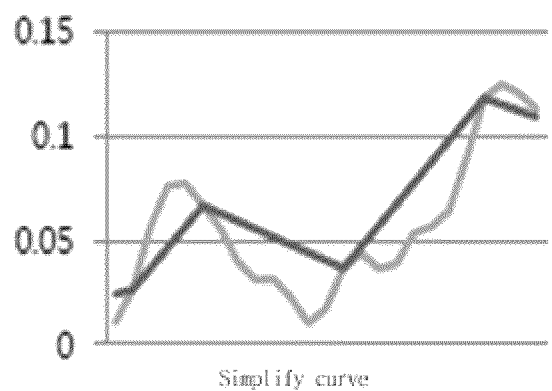
Figure 6:
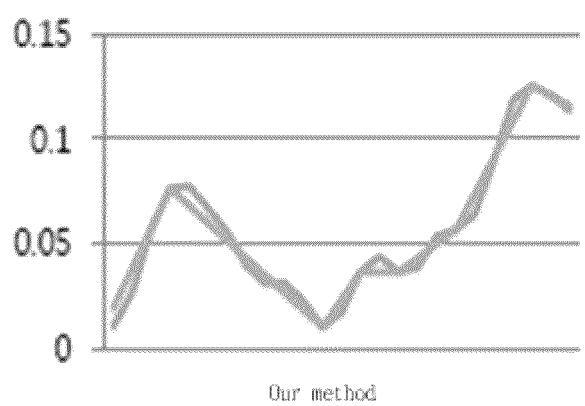
Figure 7:
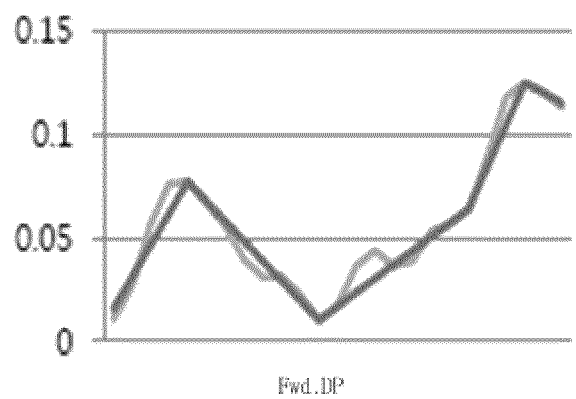
Figure 8:
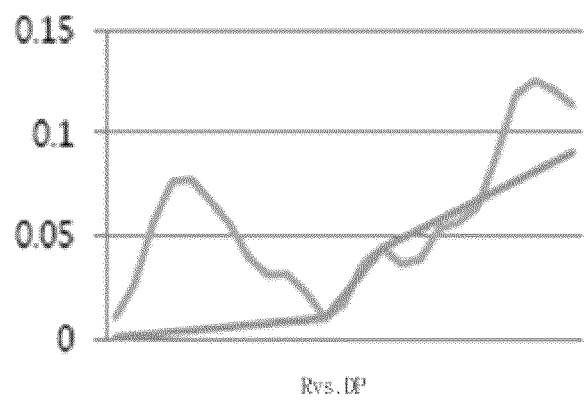

FIGS. 4 to 9 are graphs which compares results of existing graph simplification methods and the method according to an embodiment of the present disclosure. FIG. 4 shows results of conventional graph simplification methods and the method according to an embodiment of the present disclosure in the entire region of the original graph. In FIGS. 4-9, "org" refers to original graph, "Fwd. DP" refers to the forward Douglas-Peucker algorithm, and "Rvs. DP" refers to the reverse Douglas-Peucker algorithm. And, FIGS. 5 to 8 respectively show the simplify curve method, the method according to an embodiment of the present disclosure, the forward Douglas-Peucker algorithm, and the reverse Douglas-Peucker algorithm in a partial region. In FIGS. 4 to 8, it could be found that the method according to an embodiment of the present disclosure simplifies the original graph more accurately than the others.

Figure 9:
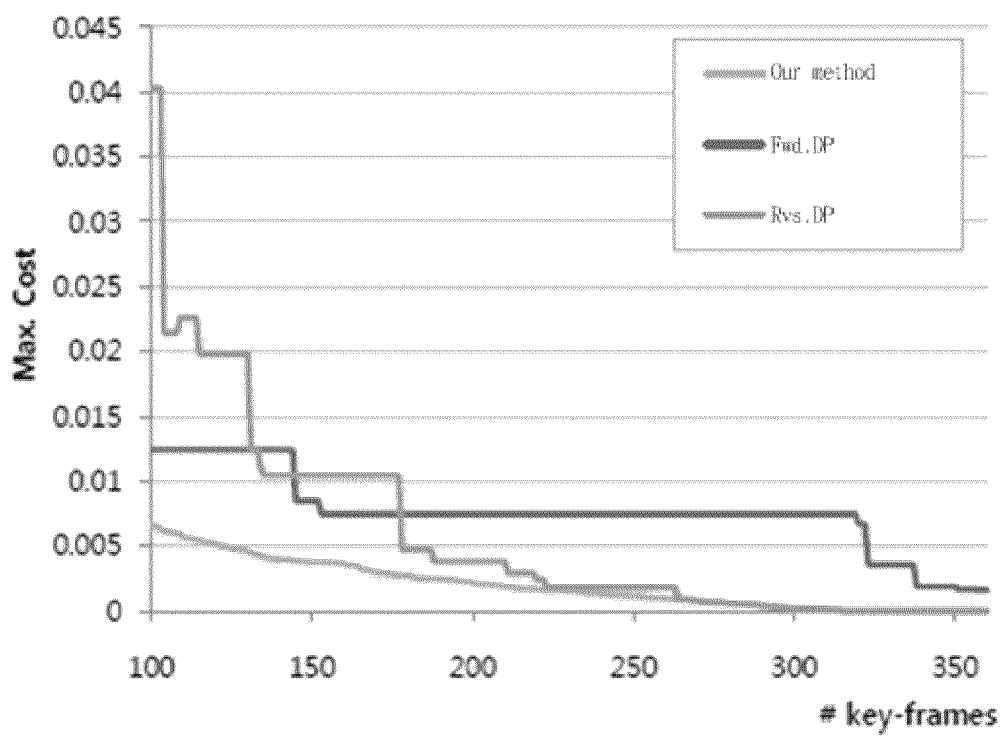

FIG. 9 is a graph which compares cost values of each method in accordance with the degree of simplification, and it could be found that the cost generated by the method according to the embodiment of the present disclosure is smallest.

Figure 10:
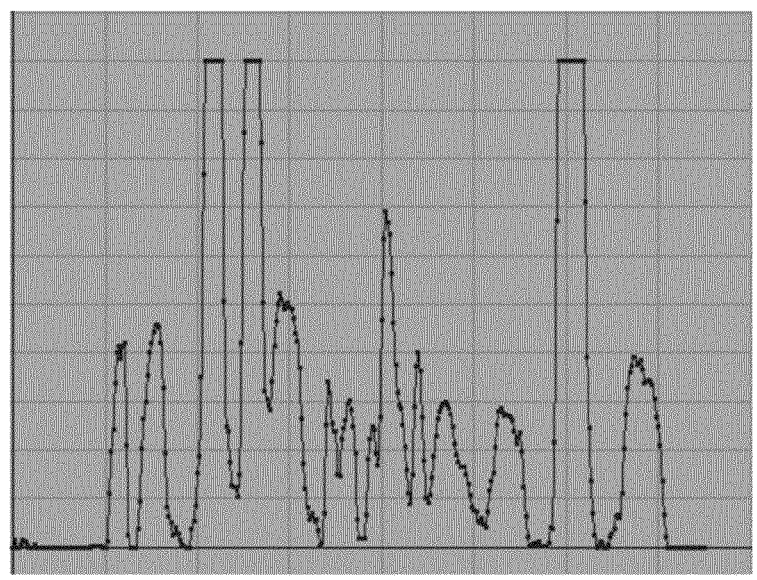
FIGS. 10 and 11 are graphs showing an example of a graph simplified by the method for dense graph simplification according to an embodiment of the present disclosure.
Figure 11:
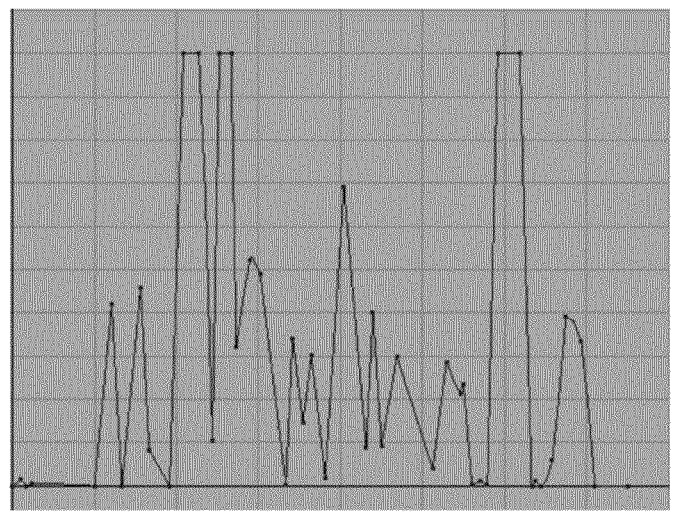

FIGS. 10 and 11 show an example of graph simplification using the method for dense graph simplification according to an embodiment of the present disclosure, in which an animation graph having key-frame information at every frame is simplified. FIG. 10 shows the original graph (org), and FIG. 11 shows a simplified graph (sim). Comparing FIG. 10 with FIG. 11, it could be found that the simplified graph (sim) simplified by the method for dense graph simplification according to according to an embodiment of the present disclosure is very similar to the original graph (org). The method for dense graph simplification according to the present disclosure may be used in various fields, and the present disclosure is particularly useful in stereoscopic 3D and character animation fields, which use 1D graphs with dense data very frequently.

Figure 12:
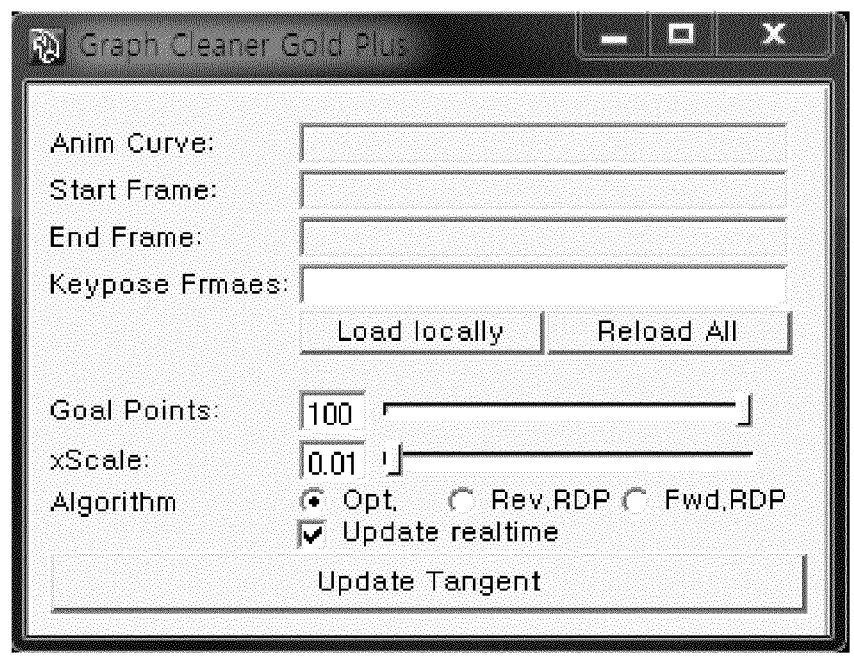
FIG. 12 is a diagram showing a graphic-user interface as an example of a user interface shown in FIG. 1.

FIG. 12 shows a graphic-user interface as an example of the user interface 100 of FIG. 1. In FIG. 12, "Anim Curve" is a field for selecting an original graph (org) to be simplified. "Start Frame" and "End Frame" respectively represent a start and an end of a region to be simplified in each original frame (org). "Keypose Frames" represents points that must be designated as salient points regardless of a simplification algorithm. "Load Locally" and "Reload All" are buttons for designating a selected graph as a graph to be simplified. In other words, these buttons are used for a user to determine whether or not to approve a simplified graph. "Goal Point" is a target number of salient points for simplification. "xScale" defines an interval value between data of a graph, and the simplification result may be finely adjusted by modifying the interval value. The three selection buttons of "Algorithm" allow a user to select one of the method for dense graph simplification according to the embodiment of the present disclosure or existing simplification methods. "Update Tangent" is a button for tangent adjustment.

Thus, the method, apparatus, and system for dense graph simplification according to the present disclosure ensure optimal results and allow interactive control of a user when simplifying a 1D graph with dense data. In addition, the present disclosure may give optical results most similar to an original graph within conditions set by the user, in comparison to existing methods which do not ensure optimal simplification results.

While the present disclosure has been described with respect to the specific embodiments, it will be apparent to those skilled in the art that various changes and modifications may be made without departing from the spirit and scope of the disclosure as defined in the following claims.

What is claimed is:

1. A method for dense graph simplification, comprising:
   receiving an original graph and extracting a plurality of salient points using a salient point extracting unit to minimize a cost representing a greatest vertical distance between the original graph and each of a plurality of lines connecting two data points in a designated region on the original graph by applying dynamic programming;
   outputting a simplified graph in which the extracted salient points are connected in a designated manner and a tangent is adjusted by a tangent adjusting unit;
   wherein said extracting the plurality of salient points includes:
      receiving the original graph;
      calculating, for all data points in the designated region on the original graph, the cost corresponding to a plurality of lines going to a plurality of other points located in a forward direction and the salient point corresponding to the cost, and storing the cost and the salient point in a 2-point path lookup table; and
      selecting the salient point corresponding to the respective cost, if the calculated cost is smaller than or equal to a designated cost threshold; and
   wherein said selecting the salient point includes:
      selecting the salient point corresponding to the respective cost, if the calculate cost is smaller than or equal to a designated cost threshold;
      determining whether the number of calculated salient points is greater than or equal to a designated number, if the calculated cost is greater than the designated cost threshold;
      selecting the calculated salient points, if the calculated number of the salient points is greater than or equal to the designated number; and
      returning to said storing the cost and the salient point in the 2-point path lookup table, if the number of the calculated salient points is smaller than the designated number.

2. The method for dense graph simplification according to claim 1, wherein the cost and the salient point corresponding to the cost are calculated by Equation 1 in order to calculate an optimal k-th path (k is a natural number) starting from the starting point p[start] and going to all of other points p[n]:

$$\min_m \max(E_{k-1}(p[\text{start}], p[m]), E_2(p[m], p[n]))$$

where p[start] denotes the starting point of all data points, p[m] (m is a natural number) denotes a certain salient point for calculating the optimal k-th path (k is a natural number), p[n] denotes the end point of the all data points, and $E_k$ denotes a cost of k-th path between two points.

3. The method for dense graph simplification according to claim 2, wherein, in said storing the cost and the salient point in the 2-point path lookup table, the cost and the salient point are calculated with reference to the 2-point path lookup table previously calculated and stored.

4. The method for dense graph simplification according to claim 3, wherein, in said storing the cost and the salient point in the 2-point path lookup table, the cost is calculated by using parallel graphics processing unit (GPU) programming.

5. The method for dense graph simplification according to claim 1, wherein, after said receiving the original graph, said extracting the plurality of salient points further includes receiving settings including information of the designated region on the original graph.

6. The method for dense graph simplification according to claim 1, wherein said outputting the simplified graph includes:
   connecting the extracted salient points with a Catmull-Rom spline; and
   outputting the simplified graph in which the extracted salient points are connected and the tangent is adjusted.

7. The method for dense graph simplification according to claim 6, wherein, in said connecting the extracted salient pints with a Catmull-Rom spline, a tangent parameter of the Catmull-Rom spline is exceptionally applied as a horizontal flat tangent at local maximum points and local minimum points.

8. The method for dense graph simplification according to claim 7, wherein said outputting the simplified graph includes:
- displaying a graph in which the extracted salient points are connected and the tangent is adjusted;
- if a user approves the displayed graph, outputting the approved graph as the simplified graph; and
- if the user does not approve the displayed graph, receiving new settings for the tangent from the user and adjusting the tangent again.

9. An apparatus for dense graph simplification, comprising:
- a salient point extractor for receiving an original graph and extracting a plurality of salient points to minimize a cost representing a greatest vertical distance between the original graph and each of a plurality of lines connecting two data points in a designated region on the original graph by applying dynamic programming; and
- a tangent adjuster for outputting a simplified graph in which the extracted salient points are connected in a designated manner and a tangent is adjusted;
- wherein said extracting the plurality of salient points includes:
  - receiving the original graph;
  - calculating, for all data points in the designated region on the original graph, the cost corresponding to a plurality of lines going to a plurality of other points located in a forward direction and the salient point corresponding to the cost, and storing the cost and the salient point in a 2-point path lookup table; and
  - selecting the salient point corresponding to the respective cost, if the calculated cost is smaller than or equal to a designated cost threshold; and
- wherein said selecting the salient point includes:
  - selecting the salient point corresponding to the respective cost, if the calculate cost is smaller than or equal to a designated cost threshold;
  - determining whether the number of calculated salient points is greater than or equal to a designated number, if the calculated cost is greater than the designated cost threshold;
  - selecting the calculated salient points, if the calculated number of the salient points is greater than or equal to the designated number; and
  - returning to said storing the cost and the salient point in the 2-point path lookup table, if the number of the calculated salient points is smaller than the designated number.

10. The apparatus for dense graph simplification according to claim 9, wherein the salient point extractor includes a calculation accelerator that uses parallel graphics processing unit (GPU) programming for calculation of the cost.

11. The apparatus for dense graph simplification according to claim 10, wherein the salient point extractor further includes a 2-point path lookup table for storing the cost corresponding to a plurality of lines going to a plurality of other points located in a forward direction for all data points in the designated region on the original graph and also storing a salient point corresponding to the cost.

12. The apparatus for dense graph simplification according to claim 11, wherein the cost and the salient point corresponding to the cost are calculated by Equation 1 in order to calculate an optimal k-th path (k is a natural number) starting from the starting point p[start] and going to all of other points p[n]:

$$\min_m \max(E_{k-1}(p[start],p[m]),E_2(p[m],p[n]))$$ [Equation 1]

where p[start] denotes the starting point of all data points, p[m] (m is a natural number) denotes a certain salient point for calculating the optimal k-th path (k is a natural number), p[n] denotes the end point of the all data points, and $E_k$ denotes a cost of k-th path between two points.

13. The apparatus for dense graph simplification according to claim 9, wherein the tangent adjuster connects the extracted salient points with a Catmull-Rom spline and outputs the simplified graph in which the tangent of the connected curve is adjusted.

14. The apparatus for dense graph simplification according to claim 13, wherein the tangent adjuster applies a horizontal flat tangent as a tangent parameter of the Catmull-Rom spline exceptionally at local maximum points and local minimum points.

15. A system for dense graph simplification, comprising:
- an apparatus for dense graph simplification according to the claim 9;
- at least one of a user interface, a storage medium and network for receiving the original graph and transferring the original graph to the apparatus for dense graph simplification; and
- an application program unit to which the simplified graph is outputted from the apparatus for dense graph simplification.

16. The system of claim 15, wherein the user interface receives the original graph with settings of a user and applies the settings to the apparatus for dense graph simplification.

17. The system of claim 15, wherein the application program unit is implemented as software that performs designated operations by using the simplified graph.

18. The system of claim 15, wherein the application program unit is a non-transitory storage medium storing the simplified graph.

* * * * *